(12) United States Patent
Kindler et al.

(10) Patent No.: US 7,043,197 B2
(45) Date of Patent: May 9, 2006

(54) TELECOMMUNICATION SYSTEM FOR THE BIDIRECTIONAL TRANSMISSION OF DATA AND VOICE SIGNALS

(75) Inventors: Matthias Kindler, Neubiberg (DE); Shimon Peleg, Hod-Hasharon (IL)

(73) Assignee: Infineon Technologies AG, Munich (DE)

( * ) Notice: Subject to any disclaimer, the term of this patent is extended or adjusted under 35 U.S.C. 154(b) by 222 days.

(21) Appl. No.: 10/218,357

(22) Filed: Aug. 14, 2002

(65) Prior Publication Data

US 2003/0104810 A1 Jun. 5, 2003

(30) Foreign Application Priority Data

Nov. 30, 2001 (DE) ................................ 101 58 808

(51) Int. Cl.
*H04B 7/185* (2006.01)
*H04H 1/00* (2006.01)
*H04J 1/00* (2006.01)
*H04N 7/173* (2006.01)

(52) U.S. Cl. .................... 455/12.1; 455/3.05; 370/487; 370/493; 370/490; 725/106; 725/109; 725/111; 709/218; 375/222

(58) Field of Classification Search ............... 455/12.1, 455/3.02, 427, 3.05; 709/217, 218, 231; 725/48, 111, 109, 110, 105, 106; 370/480, 370/493, 487, 490; 375/222
See application file for complete search history.

(56) References Cited

U.S. PATENT DOCUMENTS

| | | | | |
|---|---|---|---|---|
| 5,852,721 | A * | 12/1998 | Dillon et al. ................ | 709/217 |
| 6,078,961 | A * | 6/2000 | Mourad et al. .............. | 709/235 |
| 6,088,368 | A | 7/2000 | Rubinstain et al. | |
| 6,185,205 | B1 * | 2/2001 | Sharrit et al. ................ | 370/389 |
| 6,385,647 | B1 * | 5/2002 | Willis et al. ................. | 709/217 |
| 6,665,546 | B1 * | 12/2003 | Slaughter et al. ......... | 455/562.1 |
| 6,674,994 | B1 * | 1/2004 | Fell et al. ................... | 455/3.06 |
| 6,799,364 | B1 * | 10/2004 | Matz et al. .................. | 29/600 |
| 6,810,413 | B1 * | 10/2004 | Rajakarunanayake et al. ........................... | 709/203 |
| 2002/0026643 | A1 * | 2/2002 | Ewen et al. ................ | 725/109 |
| 2002/0154055 | A1 * | 10/2002 | Davis et al. ................ | 342/352 |
| 2004/0110466 | A1 * | 6/2004 | Perlman ..................... | 455/12.1 |
| 2004/0226045 | A1 * | 11/2004 | Nadarajah ................... | 725/97 |

FOREIGN PATENT DOCUMENTS

| | | |
|---|---|---|
| DE | 198 05 970 | 8/1999 |
| DE | 198 05 970 A1 | 8/1999 |
| DE | 101 58 808 * | 6/2003 |
| EP | 0 915 591 | 5/1999 |
| EP | 0 915 591 A2 | 5/1999 |
| WO | 03/047126 * | 6/2003 |

* cited by examiner

*Primary Examiner*—Rafael Perez-Gutierrez
(74) *Attorney, Agent, or Firm*—Jenkins, Wilson & Taylor, P.A.

(57) ABSTRACT

Telecommunication system for bidirectional transmission of data and voice signals with a data network (2), which is connected via a satellite data transmission link (6, 5, 8) for bidirectional data signal transmission to at least one satellite device (7), which is connected to a 10 Base S switching device (14); a telephone network (25), which is connected via a number of subscriber telephone lines (23) for bidirectional voice signal transmission to the 10 Base S switching device (14); and with a number of 10 Base S subscriber modems (18), which are connected for bidirectional voice and data signal transmission to the 10 Base S switching device (14).

9 Claims, 4 Drawing Sheets

TELECOMMUNICATION SYSTEM FOR THE BIDIRECTIONAL TRANSMISSION OF DATA AND VOICE SIGNALS

TECHNICAL FIELD

The invention relates to a telecommunication system for the bidirectional transmission of data and voice signals to the building of the customer and in the building of the customer, the data signals being transmitted to the building via a satellite link and the voice signals being transmitted to the building via telephone lines, while data and voice signals are transmitted in the building via telephone lines.

BACKGROUND ART

The Internet is gaining increasingly in importance as a data network. Both the number of subscribers and the amounts of data transmitted by each subscriber are constantly increasing. For private subscribers in particular, access to the data network, which usually takes place via the conventional telephone network, proves to be a critical bottleneck. Traditional access techniques restrict the data rate, since the telephone network was originally optimized for voice communication.

Therefore, the XDSL transmission system was developed for rapid Internet access. FIG. 1 shows an XDSL data transmission system according to the prior art. The XDSL data transmission system uses the existing twin copper wires of the conventional telephone network. In this case, the subscribers are connected by means of an XDSL modem to a central exchange via an associated two-wire telephone line in each case. The central exchange is connected to the data network, for example the Internet, and the conventional telephone network. The voice and data signals are bidirectionally transmitted between the central exchange and the subscriber XDSL modem via the two-wire telephone lines. The disadvantage of the telecommunication system represented in FIG. 1 is that the range between the exchange and the subscriber modems is very limited and the costs for providing the infrastructure are very high. Each subscriber must have an XDSL modem of its own for the connection of the PC and the telephone. In addition, a corresponding XDSL modem must likewise be provided in the central exchange for each subscriber. The expenditure on circuitry for such a telecommunication system is therefore very high. In addition, it is not possible for many end subscribers to be connected to the XDSL telecommunication system, since the distance between the central exchange and the private household is too great.

For such private households, the prior-art telecommunication system represented in FIG. 2 was therefore proposed. In the case of the telecommunication system represented in FIG. 2, the end subscribers are connected via a 10 Base S modem to a local 10 Base S switch. U.S. Pat. No. 6,088,368 describes the circuitry of the 10 Base S modem in detail. The 10 Base S telecommunication system described there is capable of transmitting about 10 megabits per second of data via a conventional copper infrastructure. The 10 Base S telecommunication system uses carrierless amplitude and phase modulation. A specific choice of the carrier frequency prevents the need for the carrier frequency itself to be transmitted here. A special form of 64 quadrature amplitude modulation is involved. With the 10 Base S data transmission system, it is possible to achieve a very high data transmission rate via the conventional twisted copper telephone lines, which were originally designed with bandwidths between 300 kHz and 400 kHz for voice signal transmission. The 10 Base S switching device is connected via local two-wire telephone lines to the respective 10 Base S modem of the end subscribers. A data processing terminal or PC and a voice signal terminal or telephone are respectively connected to the 10 Base S modems. The 10 Base S switch is connected via a local data transmission network, for example an Ethernet network, to a BWA modem (BWA: Broadband Wireless Access). The BWA modem is connected to an antenna for the bidirectional data exchange via a radio link. A radio link serves for the bidirectional data exchange between the local antenna and a central antenna, which is connected to a data network, for example the Internet. The disadvantage of the telecommunication system for the bidirectional transmission of data and voice signals represented in FIG. 2 is that the data transmission link is very susceptible to disturbances. In addition, many buildings with local antennas cannot exchange a data signal with the central antenna on account of shadows or obstacles. The expenditure on circuitry for the infrastructure represented in FIG. 2 is likewise high, since a relatively large number of antennas have to be provided to provide coverage for all the buildings to exchange data with the data network.

The telecommunication system for the bidirectional transmission of data and voice signals represented in FIG. 3 was therefore proposed. FIG. 3 shows a telecommunication system which on the one hand uses a 2-way satellite system with a cable network for the data transmission to the building and in the building and on the other hand comprises a conventional telephone system for the voice transmission to the building and in the building. The 2-way system is described in detail in the standard ETSI TR 101 790. A data network in this case exchanges data via a gateway and via a central satellite system with a satellite, which serves as a relay station. The data transmitted to the satellite are transmitted from the latter to a local satellite device. This satellite device comprises an outdoor satellite unit (ODU: Outdoor Unit) and an indoor satellite unit (IDU: Indoor Unit). The indoor satellite unit is connected via a cable head end and a coax cable network to a multiplicity of subscriber data modems in the private households. Respectively connected to the subscriber data modems is a data processing terminal, for example a PC. The subscriber terminals transmit data via via the coax cable network, the local satellite device and the satellite transmission link to the central satellite system, which is connected to the data network. Each subscriber additionally has a conventional telephone, which is connected via further telephone line to a central exchange. The central exchange is connected to the conventional telephone network. In the case of the conventional telecommunication system represented in FIG. 3, the bidirectional voice signal transmission and the bidirectional data transmission take place in two separate telecommunication systems. The disadvantage of the telecommunication system for the bidirectional transmission of data and voice signals represented in FIG. 3 is that an independent cable network has to be provided in each case for the data transmission. The setting up of such an infrastructure, for example a coax cable network to provide the data link for all the end subscribers, is very complex and costly.

SUMMARY OF THE INVENTION

It is therefore the object of the present invention to provide a telecommunication system for the bidirectional transmission of data and voice signals which makes optimum use of the existing infrastructure and requires minimal expenditure on circuitry.

This object is achieved according to the invention by a telecommunication system for the bidirectional transmission of data and voice signals with the features specified in patent claim 1.

The invention provides a telecommunication system for bidirectional data transmission with a) a data network, which is connected via a satellite transmission link for bidirectional data signal transmission to at least one satellite device, which is connected to a 10 Base S switching device;
b) a telephone network, which is connected via a number of subscriber telephone lines for bidirectional voice signal transmission to the 10 Base S switching device; and
c) a number of 10 Base S subscriber modems, which are connected for bidirectional voice and data signal transmission to the 10 Base S switching device.

The advantage of the telecommunication system according to the invention in comparison with the first conventional telecommunication system, as represented in FIG. 1, is that the range for data transmission is virtually unlimited on account of the satellite transmission link for the bidirectional data signal transmission.

The advantage of the telecommunication system for the bidirectional transmission of data and voice signals according to the invention in comparison with the second conventional telecommunication system, as represented in FIG. 2, is that the data transmission link of the telecommunication system according to the invention is far less sensitive and the number of necessary central satellite devices to provide coverage for all the subscribers is far fewer, since in fact only one central transmitting station is necessary.

The advantage of the telecommunication system for the bidirectional transmission of data and voice signals according to the invention in comparison with the third conventional telecommunication system, as represented in FIG. 3, is that it is not necessary to provide in addition to the 2-way satellite system a second, independent data network (for example a coax network), involving great expenditure on circuitry, for bidirectional data transmission.

In the case of a preferred embodiment of the telecommunication system according to the invention, a data terminal for the data processing of the transmitted data signal and a telephone terminal for the transmitted voice signal can be connected to each 10 Base S subscriber modem.

The telephone lines are preferably two-wire telephone lines.

The satellite device of the telecommunication system according to the invention preferably comprises an outdoor satellite unit (ODU) and an indoor satellite unit (IDU).

In this case, the outdoor satellite unit (ODU) preferably has a satellite antenna and a satellite signal transceiver.

The outdoor satellite unit (ODU) preferably has a mechanical system for pointing the satellite antenna.

The satellite transmission link of the telecommunication system according to the invention preferably comprises at least one satellite.

The indoor satellite unit (IDU) preferably has a network interface for a local data network.

The local data network is preferably an Ethernet data network.

The local data network is preferably connected to the 10 Base S switching device.

BRIEF DESCRIPTION OF THE DRAWINGS

A preferred embodiment of the telecommunication system according to the invention is now described with reference to the accompanying figures to explain features that are essential for the invention. In the drawing.

DETAILED DESCRIPTION OF THE DRAWINGS

Figure 4:
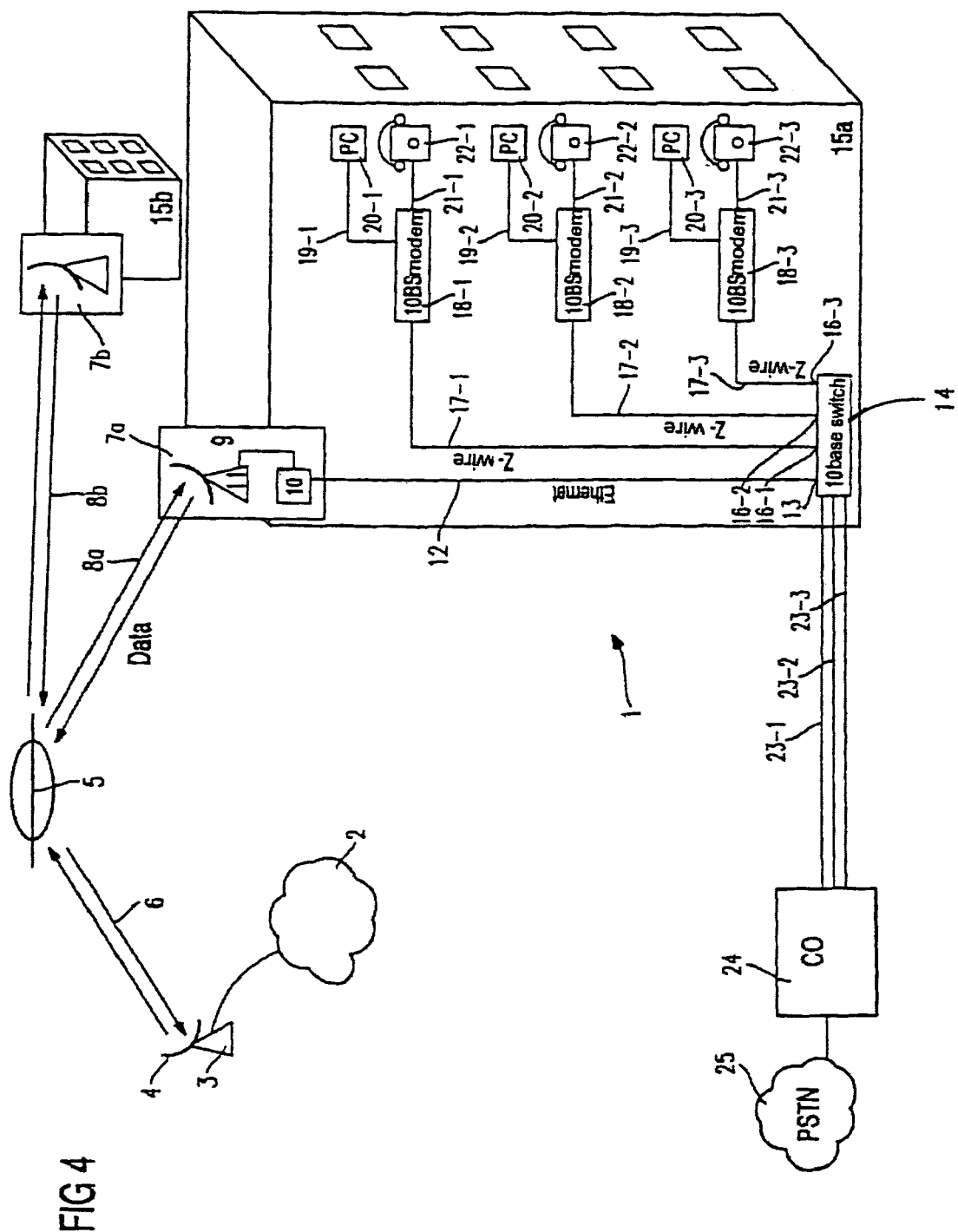
FIG. 4 shows a preferred embodiment of the telecommunication system according to the invention.

The telecommunication system 1 according to the invention, as represented in FIG. 4, contains a data network 2. The data network 2 is, for example, the Internet. The data network 2 is connected via a gateway to a central satellite device 3. The central satellite device 3 has a satellite transmitting and receiving antenna 4. The satellite antenna 4 is pointed at an orbiting satellite 5. The satellite 5 is preferably in a geostationary orbit. The satellite antenna 4 of the central satellite system 3 exchanges data bidirectionally with the satellite 5 via a first satellite transmission link 6. The satellite 5 serves as a relay station for relaying data. For this purpose, the satellite transmits data to a multiplicity of local satellite devices 7a, 7b via satellite transmission links 8a, 8b. Conversely, the satellite 5 receives data from the local satellite devices 7a, 7b and relays them via the satellite transmission link 6 to the central satellite device 3.

As represented in FIG. 4, each local satellite device 7 has an outdoor satellite unit 9 and an indoor satellite unit 10 connected to the latter.

The outdoor satellite unit 9 in this case substantially comprises a satellite antenna and a satellite signal transceiver 11 connected to the latter. In addition, a mechanism is provided for pointing the satellite antenna at the satellite 5.

The indoor satellite unit 10 has a network interface for a local data network LAN. The local data network is, for example, an Ethernet data network. As represented in FIG. 4, the indoor satellite unit 10 is connected via a local network cable 12 to a connection 13 of a 10 Base S switching device 14. The 10 Base S switching device 14 has a local two-wire telephone connection 16 for each subscriber within a building 15. At each local subscriber connection 16 of the 10 Base S switching device 14 there is a 10 Base S modem 18, as described in U.S. Pat. No. 6,088,368, connected via a local two-wire telephone line 17.

A data processing terminal 20 can be connected to each subscriber modem 18 via a data line 19. In addition, a telephone terminal 22 can be respectively connected to the subscriber modem 18 via a line 21.

The 10 Base S switching device 14 within a building 15 is connected via public two-wire telephone lines 23 for each end subscriber to a public exchange 24. The public exchange 24 is connected to the conventional telephone network 25. Voice signals are bidirectionally transmitted via the two-wire telephone lines 23 between the public exchange 24 and the 10 Base S switching device 14, which switches the voice signals through to the lines 17 of the various end subscribers. Conversely, the 10 Base S switching device 14 switches the voice signals emitted by the subscriber telephone terminals 22 through to the associated public two-wire telephone line 23, so that these signals pass as values via the public exchange 24 into the public telephone network 25.

The data signal transmitted from the data network 2 via the broadband satellite transmission link is emitted by the local satellite device 7 via the local broadband data network cable 12 to the 10 Base S switching device 14. The 10 Base S switching device 14 emits the received data signal to the various 10 Base S modems 18 of the subscribers. The received data signals pass from the 10 Base S modems 18 via the lines 19 to the data processing terminals 20. The data processing terminals are, in particular, PCs. The data signals emitted by the data processing terminals 20 are conversely emitted by the 10 Base S switching device 14 via the local data network cable 12 to the local satellite device 7 and pass from there via the satellite data transmission link and via satellite 5 to the central satellite device 3. From there, they are fed via the gateway into the data network 2.

On the lines 17 between the 10 Base S switching device 14 and the various 10 Base S modems 18, the voice signals, the downstream data to the end subscribers and the upstream data from the end subscribers are transmitted by frequency division multiplexing. On the lines 17, the data is transmitted in three different frequency bands, one frequency band being provided for the voice signals, one frequency band being provided for the downstream data and one frequency band being provided for the upstream data.

Figure 1:
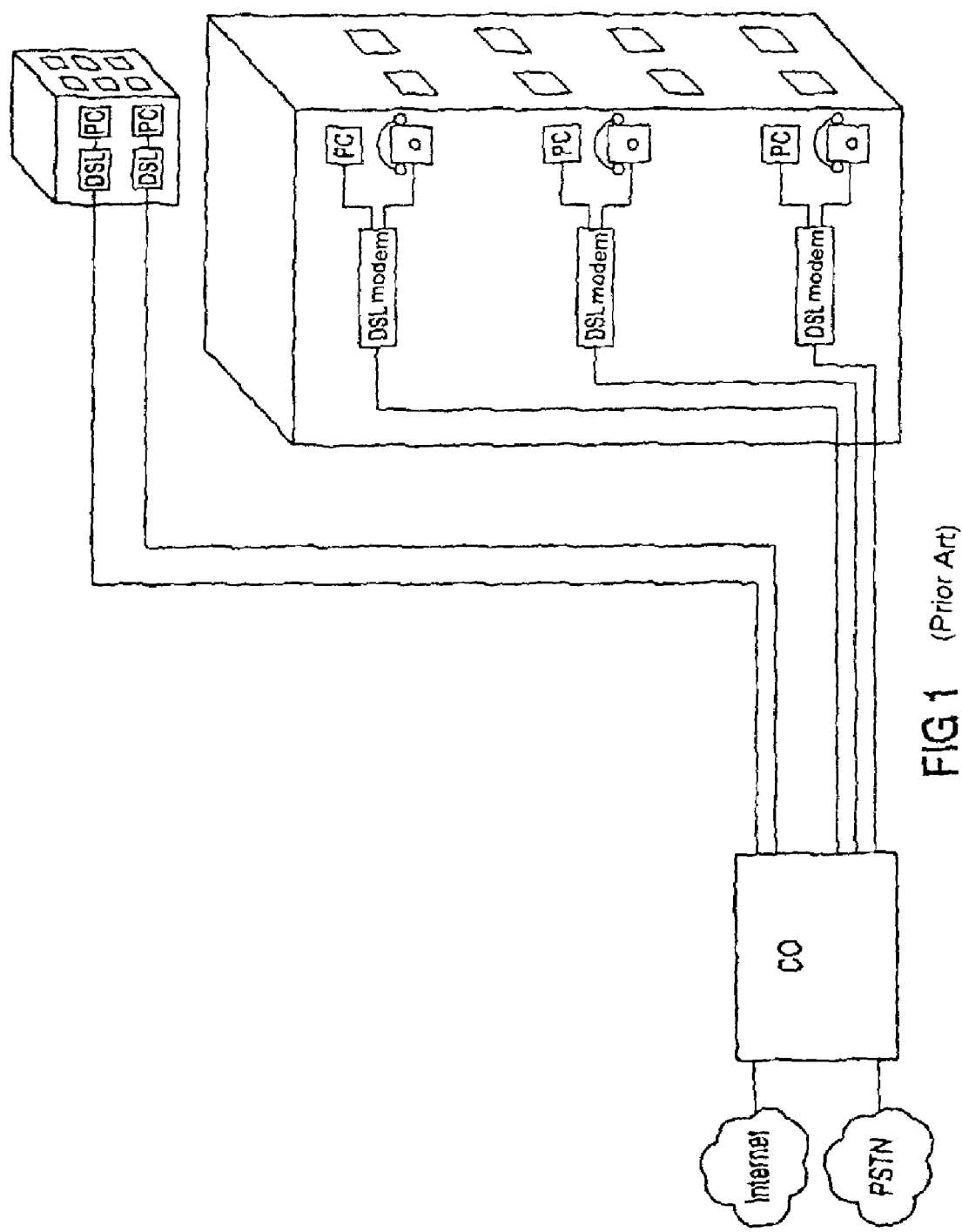
FIG. 1 shows a first telecommunication system according to the prior art.
Figure 2:
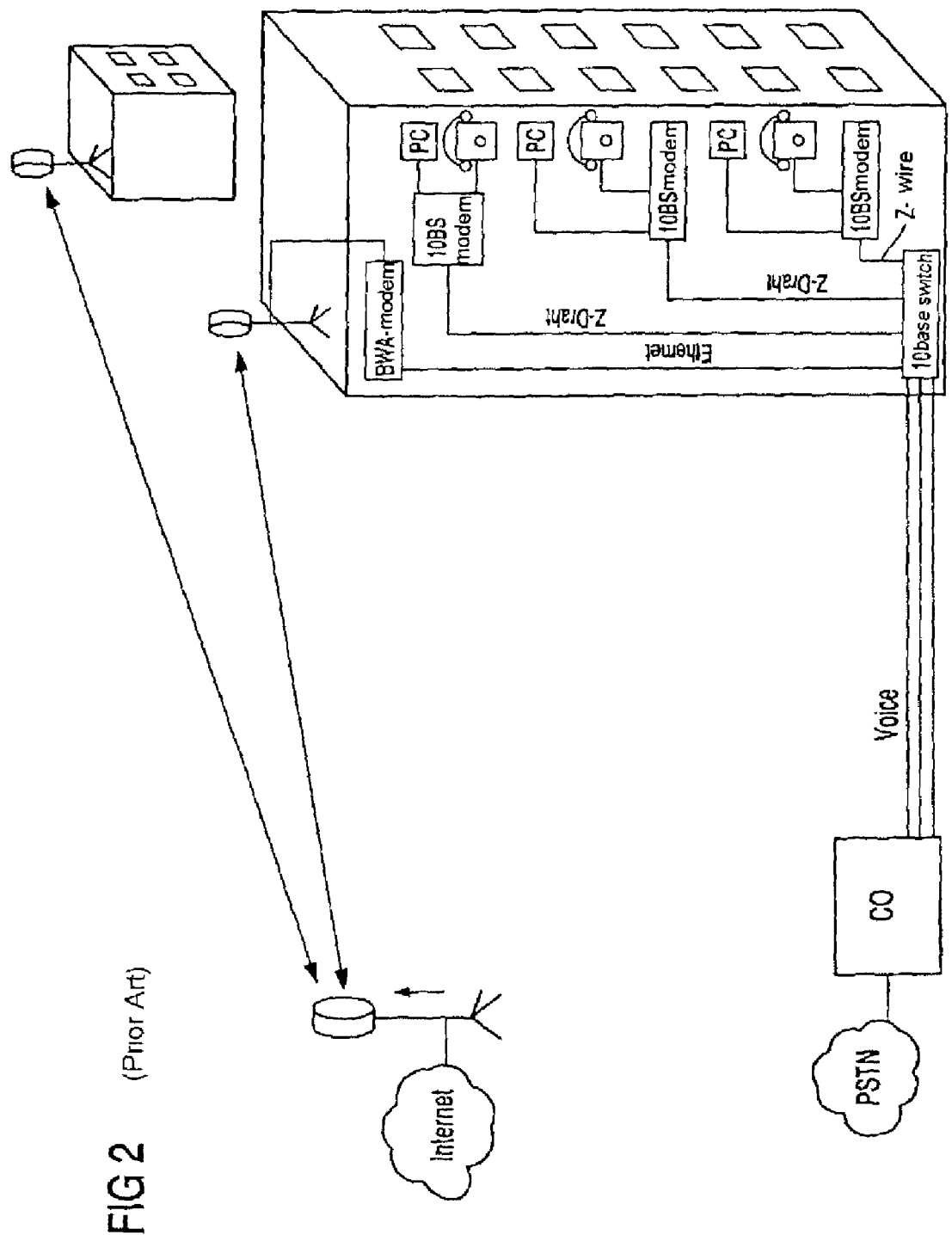
FIG. 2 shows a second telecommunication system according to the prior art.
Figure 3:
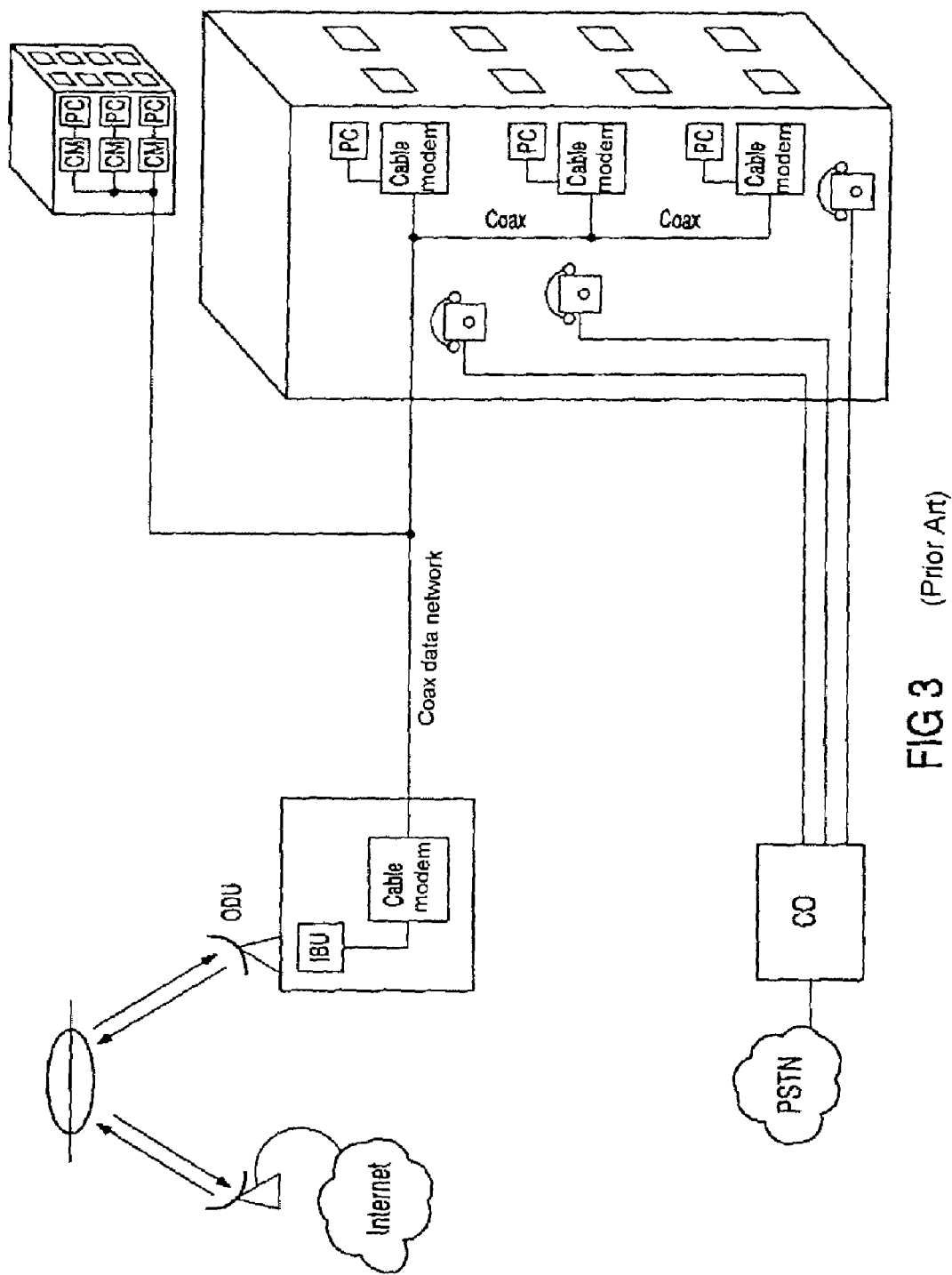
FIG. 3 shows a third telecommunication system according to the prior art.

The communication system represented in FIG. 4 makes optimum use of the already existing infrastructure of the conventional telephone network. The existing two-wire telephone lines 20 continue to be used for the bidirectional voice signal transmission. Only one local satellite device 7 has to be provided for the bidirectional data signal transmission in each building 15. Cabling of the various buildings 15 via a data transmission network, as in the case of the conventional telecommunication system according to the prior art, which is represented in FIG. 3, is not necessary. A satellite transmission link which comprises the section 6, the satellite 5 and one of the various satellite transmission links 8 is insensitive to disturbances, and shadowing caused by existing obstacles is largely ruled out. In addition, the range of the satellite data transmission link is as great as desired. As a result, it is possible also to connect to the data network 2 buildings which are relatively far away from a public exchange 24, previously precluding XDSL access.

What is claimed is:

1. Telecommunication system for bidirectional transmission of data and voice signals to at least one customer building, the system comprising:
   a) a data network, which is connected via a satellite data transmission link for bidirectional data signal transmission to at least one local satellite device, provided in at least one customer building, the local satellite device being connected to a 10 Base S switching device via a local broadband data network cable;
   b) a public telephone network, which is connected via a number of subscriber telephone lines for bidirectional voice signal transmission to the 10 Base S switching device; and
   c) a number of 10 Base S subscriber modems, which are connected via local telephone lines for bidirectional voice and data signal transmission to the 10 Base S switching device;
   d) wherein the data transmission link has at least one satellite as a relay station for relaying data between the at least one local satellite device and a central satellite device connected via a gateway to the data network;
   e) wherein downstream data is transmitted from the local satellite device via the local broadband data network cable and the 10 Base S switching device to the 10 Base S subscriber modems over the local telephone lines in a first freguency band;
   f) wherein upstream data is transmitted from the 10 Base S subscriber modems over the local telephone lines in a second frequency band to the 10 Base S switching device and via the local broadband data network cable to the local satellite device; and
   g) wherein the voice signals are transmitted over the local telephone lines in a third freguency band.

2. Telecommunication system according to claim 1, wherein a data terminal for the data processing of the transmitted data signals and a telephone terminal for the transmitted voice signal can be connected to each 10 Base S subscriber modem.

3. Telecommunication system according to claim 1, wherein the satellite device has an outdoor satellite unit and indoor satellite unit.

4. Telecommunication system according to claim 3, wherein the outdoor satellite unit has a satellite antenna and a satellite signal transceiver.

5. Telecommunication system according to claim 4, wherein the outdoor satellite unit has a mechanism for pointing the satellite antenna.

6. Telecommunication system according to claim 3, wherein the indoor satellite unit has a network interface for a local data network.

7. Telecommunication system according to claim 6, wherein the local data network is an Ethernet data network.

8. Telecommunication system according to claim 7, wherein the local data network is connected to the 10 Base S switching device.

9. Telecommunication system according to claim 1, wherein the telephone lines are two-wire telephone lines.

* * * * *